United States Patent [19]
Grosboll et al.

[11] Patent Number: 5,141,630
[45] Date of Patent: Aug. 25, 1992

[54] SEPARATION PROCESS EMPLOYING TWO STRIPPING GASES

[75] Inventors: Martin P. Grosboll, Kingwood; Richard B. Halsey, Seabrook, both of Tex.

[73] Assignee: Lyondell Petrochemical Company, Houston, Tex.

[21] Appl. No.: 732,938

[22] Filed: Jul. 19, 1991

Related U.S. Application Data

[63] Continuation of Ser. No. 493,886, Mar. 15, 1990, abandoned.

[51] Int. Cl.$^5$ .......................... B01D 3/00; C10G 7/00
[52] U.S. Cl. ..................... 208/356; 203/49; 203/91; 203/DIG. 9; 208/362
[58] Field of Search ............... 208/308, 366, 356, 357, 208/362; 203/49, DIG. 9, 91, 96, 92; 55/68

[56] References Cited

U.S. PATENT DOCUMENTS

| | | | |
|---|---|---|---|
| 3,322,667 | 5/1967 | Lawson | 208/356 |
| 3,384,577 | 5/1968 | Shaffer et al. | 208/362 |
| 3,857,902 | 12/1974 | Inomata et al. | 260/675.5 |
| 4,046,676 | 9/1977 | Asselin | 208/321 |
| 4,080,424 | 3/1978 | Miller et al. | 55/68 |
| 4,424,117 | 1/1984 | Kuno | 208/211 |
| 4,486,299 | 12/1984 | Kettinger | 208/356 |
| 4,787,967 | 11/1988 | Herbst et al. | 208/113 |
| 4,802,975 | 2/1989 | Mehlberg | 208/390 |
| 4,822,480 | 4/1989 | Harandi | 208/212 |
| 4,917,790 | 4/1990 | Owen | 208/160 |

Primary Examiner—Virginia Manoharan
Attorney, Agent, or Firm—Arnold, White & Durkee

[57] ABSTRACT

A process for separating or stripping lighter components from a heavier hydrocarbon feedstock contaminated with or otherwise including light components. The separation is accomplished by introducing the feedstock into a column and allowing the feedstock to flow through the column, contacting a first stripping medium and a second stripping medium. The first stripping medium entrains the lighter components. The second stripping medium entrains the first stripping medium and any lighter components remaining in the feedstock. Preferred first stripping media include hydrogen, methane, propane, and other inert gas and preferred second stripping media include nitrogen and other inert gas.

12 Claims, 1 Drawing Sheet

SEPARATION PROCESS EMPLOYING TWO STRIPPING GASES

This application is a continuation application of Ser. No. 07/493,886, filed Mar. 15, 1990, now abandoned.

BACKGROUND OF THE INVENTION

This invention relates to separation of relatively light components in a feed mixture from relatively heavy components using a stripping medium. The invention is especially suited for separating lighter hydrocarbons and undesirable components from heavier hydrocarbons in a petroleum refinery feedstock.

Product stripping to remove lower boiling range components from much higher boiling range components of a petroleum refinery feedstock is well known. Removal of such lower boiling range components is typically desired to enable the lower boiling range refinery product to meet certain product flash specifications required by the petroleum products market. A product flash specification is generally stated in terms of the temperature that will cause the sample to produce enough vapor to ignite when exposed to an open flame. Also, product stripping is used to remove hydrogen, hydrogen sulfide, and ammonia in petroleum feedstocks after hydrotreating.

The typical stripping technique employs a column or tower that provides contact between a feedstock liquid flowing downward in the column and a stripping vapor that flows upward through the column. The stripping vapor is most commonly steam from an external source, but the vapor can alternatively be produced within the bottom of the column by boiling the bottoms product using an external heat source and equipment commonly referred to in the industry as a reboiler.

Use of a reboiler may have the disadvantage of causing high temperatures which result in undesired feedstock product cracking. Also, hydrogen sulfide from the feedstock may accumulate in high concentrations in the reboiler and result in troublesome corrosion.

The disadvantage of using steam for stripping is that it saturates the stripped product with water. Often, the stripped product must then be dried or the water otherwise removed for the product to meet market specifications. Heating oil, for example, should not contain significant quantities of water.

In refineries, steam stripping is most commonly used in olefin gas-oil hydrotreating. However, an olefin gas-oil hydrotreater, designed for stripping with steam, cannot be used for treating heating oil without addition of a reboiler and an external heat source for stripping without steam, or a product drier for removing water left behind in the product by steam stripping.

Occasionally, an olefin gas-oil hydrotreater may be needed to provide additional capacity for treating heating oil or to provide a substitute for a heating oil hydrotreater shut down for repair. At such times, the disadvantages of steam stripping according to the design of the olefin gas-oil hydrotreater are readily apparent.

There continues to be a need for an efficient, economical process for stripping petroleum feedstocks, and particularly heating oil, of light components without contaminating the stripped product with water, and without expensive and time consuming equipment modifications.

SUMMARY OF THE INVENTION

The present invention is a process for separating or stripping lighter components from a heavier hydrocarbon feedstock contaminated with or otherwise including such light components, without the need for a reboiler, heat source or drier, and without contaminating the feedstock with water. Such lighter components may be any component such as hydrogen, hydrogen sulfide, ammonia, or hydrocarbons containing less than about eleven carbon atoms, or any combination of such components.

The process of the invention employs a column containing trays or other means for gas to contact the feedstock. Such trays or other contacting means are referred to herein as contacting trays. The column may be a typical stripping column, with the trays positioned lengthwise in a series along the length of the column, or other contacting means positioned or packed lengthwise along the length of the column, such that a fluid introduced in the column, preferably at the top or near the top of the column, and allowed to flow through the column, will flow over and/or through each contacting tray consecutively.

According to the process of the invention, the separation is accomplished by introducing the feedstock into the column and allowing the feedstock to flow through the column, over (and/or through) the contacting trays below the point of introduction of the feedstock. As the feedstock is flowing through the column over the contacting trays, a gaseous first stripping medium is introduced into the column at a location such that the stripping medium will contact the flowing feedstock. Such stripping medium will be comprised of a substance or material that, upon contact with the feedstock, will entrain the lighter components—for example, hydrogen, hydrogen sulfide, ammonia, and/or hydrocarbons containing less than about eleven carbon atoms to be separated from the feedstock. The stripping medium containing the lighter components is allowed to exit the column, preferably near or at the top of the column, as the feedstock continues to flow down through the column. A gaseous second stripping medium, different from the first, is introduced into the column at a point that it contacts the feedstock after the first stripping medium has contacted the feedstock.

This second stripping medium is comprised of a substance or material that will entrain the first stripping medium and any of the lighter components remaining in the feedstock upon contact. This second stripping medium is also allowed to exit the column, preferably near or at the top of the column. The feedstock, upon leaving the column preferably near or at the bottom of the column, is substantially depleted of its lighter components and the first stripping medium used to remove them.

Preferred examples of suitable stripping media for use in this invention include hydrogen, methane, propane, steam or other inert gas as a first stripping medium and nitrogen or other inert gas as a second stripping medium. The most preferred stripping media for heavier hydrocarbon feedstocks such as heating oil are hydrogen or steam as a first stripping medium and nitrogen as a second stripping medium.

DETAILED DESCRIPTION OF PREFERRED EMBODIMENT

Figure 1:
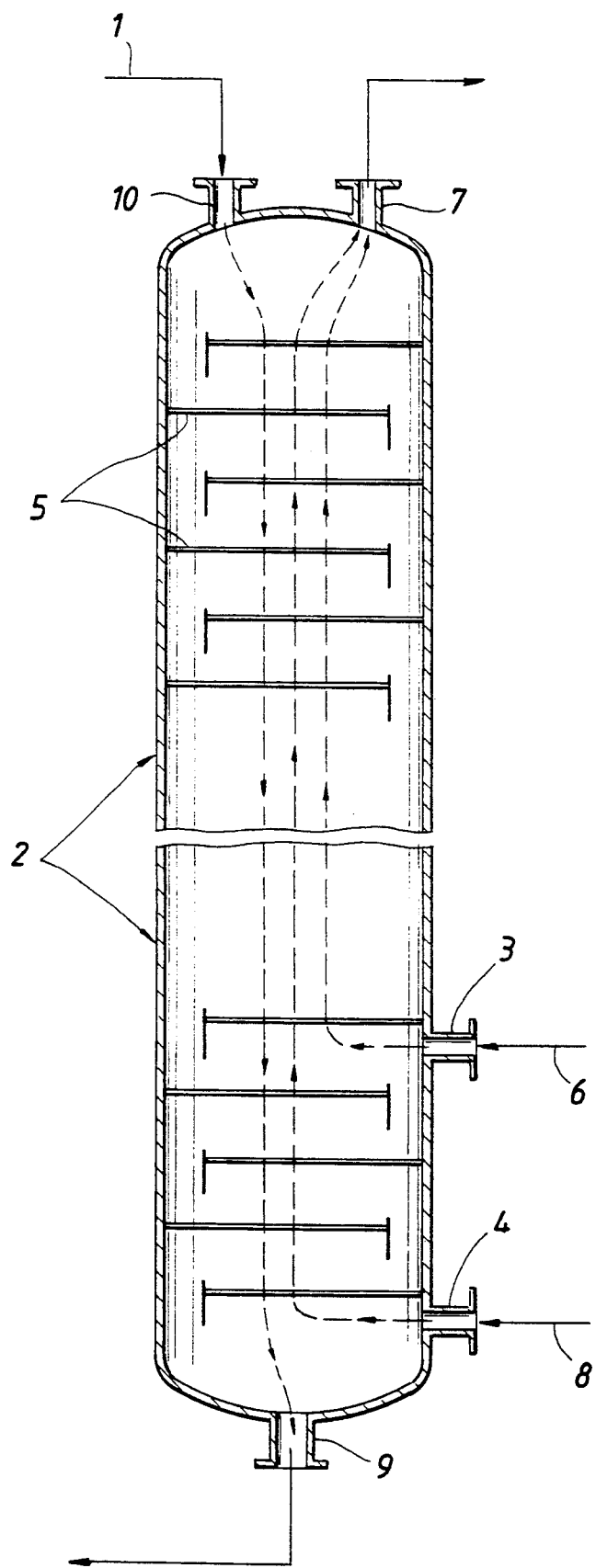
FIG. 1 is a schematic diagram of the separation process of this invention employing a column with contacting trays.

The full advantages of this invention are particularly realized when the feedstock is refined to an extent that it will be ready for market after the lighter components are removed according to the process of the invention. That is, the purposes of the invention, removal of lighter components from the feedstock, are accomplished without requiring further processing of the feedstock.

Such advantages of this invention are readily apparent in petroleum refinery applications of the invention. For example, a feedstock from a hydrotreater, which is typically used to remove sulfur, nitrogen or aromatics from the feedstock, may contain hydrogen, hydrogen sulfide, ammonia, and some volatile or light hydrocarbons, i.e., hydrocarbons substantially lighter than the desired hydrocarbons in the final product. Such light or lighter than desired hydrocarbons will typically have less than about eleven carbon atoms. The feedstock may otherwise be refined sufficiently for market. once the lighter components such as hydrogen, hydrogen sulfide, ammonia and lighter hydrocarbons are removed. For example, the feedstock might be heating oil, refined heavy residual oils, lubricating oils, kerosene, naphtha or gasoline. The process of this invention may be applied to remove the lighter components.

Applying the process of this invention as schematically diagramed in FIG. 1, the feedstock 1, for example heating oil containing lighter components (or components having a lower molecular weight than the hydrocarbons comprising the heating oil) is introduced into a column 2 at inlet 10. The column may be any column generally suitable for fractionation or distillation processes in a refinery and modified or built to have the inlets 3 and 4 needed for this invention. The column should have contacting trays 5, sufficient in number to allow the separations needed to accomplish the purposes of this invention. The flow rate of the feedstock in the column is limited by the maximum liquid throughput capacity of the column.

For example, to remove about 125 lb. moles per hour of low molecular weight contaminates such as hydrogen, hydrogen sulfide and ammonia, and about 415 lb. moles per hour of light hydrocarbons, from heating oil, at a feedstock rate of about 33,000 barrels per day, the column will preferably have about 30 contacting trays, if hydrogen and nitrogen are the stripping gases employed according to the process of this invention.

As used herein, the term "contacting trays" shall be understood to include trays or other means for gas to contact the feedstock. Such trays or means include, but are not necessarily limited to, contacting, porous or sieve trays, valve trays, and packing materials suitable for packing the column as an alternative to trays.

The contacting trays should be positioned to facilitate contacting between liquid flowing downward through the column and gas flowing upward through the column, as is common in such columns used in stripping, fractionation or distillation processes. Typically, the contacting trays are positioned lengthwise in a series, or packed, along the length of the column such that a fluid, such as the feedstock, introduced in the top or near the top of the column and allowed to flow through the column. will flow over and/or through each contacting tray consecutively. Whether a liquid will flow over and/or through a contacting tray depends on which type of tray, as "contacting tray" is defined above, is actually used. For the purposes of describing this invention, reference herein to fluid or feedstock flowing "over" a "contacting tray" shall be understood to include flow through the contacting tray as well as or instead of actually over the contracting tray as is appropriate for the type contacting tray actually employed as the term "contacting tray" is herein defined.

When the feedstock is introduced into the column, the temperature of the feedstock should be sufficiently high to increase the volatility of the feedstock components to facilitate stripping. Generally a temperature within the range of about 200° to 750° F. is preferred. This temperature may vary as the feedstock flows through the column. Further, when the feedstock is introduced into the column and during the stripping according to the process of this invention, the pressure of the column should be sufficiently low to allow the stripping to occur. Generally a pressure within the range of about 0 to 200 PSIG is preferred.

For example, in separating light hydrocarbons, hydrogen, hydrogen sulfide, and ammonia from heating oil, a feedstock temperature of about 480° F. and a column pressure of about 65 PSIG is preferred when the feedstock is flowing through the column at a rate of about 33,000 barrels per day.

A gaseous stripping medium 6 is introduced anywhere along the column between the bottom-most and upper-most contacting trays. An inlet near the bottom of the column is most preferred, for example at inlet 3 four contacting trays from the bottom of column 2 in FIG. 1. This stripping medium 6 should be comprised of a substance or material that will entrain the lighter components, such as hydrogen, hydrogen sulfide, ammonia, and light or volatile hydrocarbons, in the feedstock upon contact with the feedstock. The stripping medium should also preferably be a substance or material that is readily available and economical. Preferred examples of suitable first stripping media include hydrogen, methane, propane, steam, or other inert gas. The most preferred first stripping medium is hydrogen. The flow rate of the first stripping medium in the column should be sufficient to accomplish the stripping, i.e., sufficient to remove the desired amounts of the lighter components to obtain a satisfactory product. A preferred flow rate ratio for the flow of hydrogen with respect to the flow of feedstock is at least about three standard cubic feet per barrel of feedstock. The most preferred flow rate ratio for the flow of hydrogen with respect to the flow of feedstock is within the range of about three to forty standard cubic feet per barrel of feedstock. After contacting the feedstock and entraining a substantial amount (preferably at least about 98.0 mole percent) of the lighter components, the first stripping medium will flow out of the column at outlet 7.

As the feedstock 1, substantially depleted of volatile or lighter components, continues to flow down the column, a gaseous second stripping medium 8, different from the first stripping medium 6, is introduced anywhere along the column below the inlet for the first stripping medium 6. Most preferably, the second stripping medium 8 is introduced below the bottom-most contacting tray of the column 2, for example at inlet 4 below the bottom tray of column 2 in FIG. 1. The second stripping medium 8 should have the ability to remove or entrain first stripping medium 6, if any, remaining in the feedstock 1. The second stripping medium 8 should also preferably be relatively inert with respect to the feedstock 1, and not increase the flash point or water content of the feedstock 1. Nitrogen is the most preferred second stripping medium.

The second stripping medium 8 contacts the feedstock and removes the first stripping medium 6 and also may remove lighter components not previously removed by the first stripping medium 6 from the feedstock 1. The flow rate of the second stripping medium 8 in the column should be sufficient to remove the desired amounts of the first stripping medium and residual lighter components from the feedstock. A preferred flow rate ratio for the flow of nitrogen with respect to the flow of feedstock is at least about three standard cubic feet per barrel of feedstock. The most preferred flow rate ratio for the flow of nitrogen with respect to the flow of feedstock is within the range of about three to forty standard cubic feet per barrel of feedstock.

For example, for separating light hydrocarbons, hydrogen, hydrogen sulfide, and ammonia from heating oil, with hydrogen and nitrogen, with a feedstock temperature, flow rate, and column pressure as in the example discussed above, a hydrogen flow rate of about 50,000 SCFH and a nitrogen flow rate of about 19,000 SCFH is preferred.

The second stripping medium 8 will flow out of the column, preferably at or near the top of the column, for example at outlet 7, and the feedstock 1 will flow out of the column, preferably at or near the bottom of the column, for example at outlet 9. The feedstock should then be ready for market or further processing. Preferably, no further processing should be required due to the stripping treatment in column 2 according to the process of this invention.

The principle of the invention and the best mode contemplated for applying that principle have been described. It is to be understood that the foregoing is illustrative only and that other means and techniques can be employed without departing from the true scope of the invention defined in the following claims.

We claim:

1. A process for separating lighter components from a heavier heating oil, refined heavy residual oil, lubricating oil, kerosene, naphtha or gasoline feedstock comprising:
    introducing said feedstock into a column comprising contacting trays;
    allowing said feedstock to flow over said contacting trays;
    introducing a gaseous first stripping medium into the column at a location such that said stripping medium contacts countercurrent to said feedstock as said feedstock flows over said trays, substantially entraining said lighter components;
    allowing said first stripping medium entraining said lighter components to flow out of said column;
    introducing a gaseous second stripping medium, comprising a different substance from the first stripping medium, into the column at a location such that said second stripping medium contacts countercurrent to said feedstock substantially depleted of said lighter components by said first stripping medium, as said feedstock flows over said trays, substantially stripping said feedstock of residue of said first stripping medium before said feedstock leaves said column;
    allowing said second stripping medium together with said first stripping medium to flow out of said column; and
    allowing said substantially stripped feedstock to flow out of said column separately from said first and second stripping medium.

2. The process of claim 1 wherein said first stripping medium is hydrogen and said second stripping medium is nitrogen.

3. The process of claim 1 wherein said lighter components comprise at least one component of the group consisting of volatile hydrocarbons, hydrogen, hydrogen sulfide, and ammonia.

4. The process of claim 1 wherein the pressure of said column is within the range of about 5 to 65 PSIG and the temperature of said feedstock is sufficiently high to increase the volatility of the feedstock components to facilitate the separation of lighter components from the feedstock.

5. The process of claim 1 wherein the flow rate ratio of the flow of the first stripping medium with respect to the flow of the feedstock in the column is at least about three standard cubic feet per barrel of feedstock and the flow rate ratio of the flow of the second stripping medium with respect to the flow of the feedstock in the column is at least about three standard cubic feet per barrel of feedstock.

6. The process of claim 1 wherein said first stripping medium is introduced in said column between the first and last contacting tray of said column and said second stripping medium is introduced in said column below the point of introduction of the first stripping medium in said column.

7. A process for removing lighter components from heating oil comprising:
    introducing said heating oil into a column comprising contacting trays;
    allowing said oil to flow over said trays;
    introducing hydrogen into the column at a location such that the hydrogen contacts countercurrent to the oil as if flows over the trays and entrains said lighter components;
    allowing said hydrogen to exit the column;
    introducing nitrogen into the column at a location such that the nitrogen contacts countercurrent to the oil after the hydrogen contacts the oil as the oil flows over the trays, such that said nitrogen strips said hydrogen from said oil;
    allowing said nitrogen to exit the column together with said hydrogen; and
    allowing said oil to exit the column separately from said nitrogen.

8. The process of claim 7 wherein said lighter components comprise at least one component of the group consisting of hydrogen, hydrogen sulfide, ammonia, and hydrocarbons having less than about eleven carbon atoms.

9. A process for removing lighter components from heating oil feedstock, said lighter components comprising at least one components of the group consisting of hydrogen, hydrogen sulfide, ammonia, and hydrocarbons having less than about eleven carbon atoms, and said process comprising:
    introducing said heating oil feedstock into a column comprising contacting trays over which said oil may flow, wherein the pressure of said column is within the range of about 0 to 200 PSIG and the temperature of the heating oil feedstock is within the range of about 200 to 750°;

allowing said oil to flow over said trays;

introducing hydrogen into the column at a location such that the hydrogen contacts the oil as the oil flows over the trays and the hydrogen entrains said lighter components in said oil;

allowing said hydrogen to exit the column;

introducing nitrogen into the column at a location such that the nitrogen contacts the oil after the hydrogen contacts the oil as the oil flows over the trays, such that said nitrogen strips said hydrogen from said oil;

allowing said nitrogen to exit the column; and allowing said oil to exit the column separately from said nitrogen.

10. The process of claim 9 wherein the flow rate ratio of the flow of hydrogen with respect to the flow of the heating oil feedstock in the column is within the range of about three to forty standard cubic feet per barrel of heating oil feedstock and the flow rate ratio of the flow of nitrogen with respect to the flow of the heating oil feedstock in the column is within the range of about three to forty standard cubic feet per barrel of heating oil feedstock.

11. A process for separating lighter components comprising at least one component of the group consisting of volatile hydrocarbons, hydrogen, hydrogen sulfide and ammonia from a heavier hydrocarbon feedstock comprising:

introducing said feedstock into a column comprising contacting trays wherein the pressure of said column is within the range of about 5 to 65 PSIG and the temperature of said feedstock is sufficiently high to increase the volatility of the feedstock components to facilitate the separation of lighter components from the feedstock;

allowing said feedstock to flow over said contacting trays;

introducing a gaseous hydrogen first stripping medium into the column at a flow rate ratio at least about three standard cubic feet per barrel of feedstock and at a location such that said stripping medium contacts countercurrent to said feedstock as said feedstock flows over said trays, substantially entraining said lighter components;

allowing said first stripping medium entraining said lighter components to flow out of said column;

introducing a gaseous nitrogen second stripping medium into the column at a flow rate ratio at least about three standard cubic feet per barrel of feedstock and at a location such that said second stripping medium contacts countercurrent to said feedstock substantially depleted of said lighter components by said first stripping medium, as said feedstock flows over said trays, substantially stripping said feedstock of residue of said first stripping medium before said feedstock leaves said column;

allowing said second stripping medium together with said first stripping medium to flow out of said column; and allowing said substantially stripped feedstock to flow out of said column separately from said first and second stripping medium.

12. The process of claim 11 wherein said first stripping medium is introduced in said column between the first and last contacting tray of said column and said second stripping medium is introduced in said column below the point of introduction of the first stripping medium in said column.

* * * * *